United States Patent [19]
Muscat

[11] 4,456,103
[45] Jun. 26, 1984

[54] DRUM BRAKE WITH AUTOMATIC RECENTERING OF THE SHOES

[75] Inventor: Gérard Muscat, Blanc-Mesnil, France

[73] Assignee: Societe Anonyme DBA, Paris, France

[21] Appl. No.: 332,800

[22] Filed: Dec. 21, 1981

[30] Foreign Application Priority Data

Jan. 23, 1981 [FR] France .............................. 81 01258

[51] Int. Cl.³ ....................... F16D 51/24; F16D 65/00
[52] U.S. Cl. ........................... 188/326; 188/79.5 GE;
188/106 A; 192/75; 192/111 A
[58] Field of Search .................... 188/79.5 R, 79.5 SS,
188/79.5 GE, 79.5 GC, 79.5 GT, 325, 335, 341,
326, 106 A, 106 F; 192/99 B, 75, 111 R, 111 A

[56] References Cited
U.S. PATENT DOCUMENTS

| Re. 22,515 | 7/1944 | Schnell | 188/79.5 GT |
| 2,102,851 | 12/1937 | LaBrie | 188/78 |
| 2,241,479 | 5/1941 | Rush | 188/79.5 R |
| 2,386,913 | 10/1945 | Sawtelle | 188/79.5 GT |
| 2,583,970 | 1/1952 | Schultz | 188/79.5 GT |
| 2,596,380 | 5/1952 | Dodge | 188/79.5 R |
| 3,339,678 | 9/1967 | Burnett | 188/79.5 R |
| 4,121,701 | 10/1978 | Gestkoff | 188/79.5 GT X |

FOREIGN PATENT DOCUMENTS

| 1333050 | 6/1963 | France . |
| 1537112 | 7/1968 | France . |
| 2291411 | 6/1976 | France . |
| 2334014 | 1/1977 | France . |
| 697567 | 9/1953 | United Kingdom ....... 188/79.5 GT |
| 2003239 | 3/1979 | United Kingdom ....... 188/79.5 GT |

Primary Examiner—George E. A. Halvosa
Attorney, Agent, or Firm—Larry J. Palguta; Ken C. Decker

[57] ABSTRACT

A recentering device for a drum brake is provided in an opening of the strut placed between the shoes and includes a spring placed between two cups which are capable of sliding in the opening and both engage a fixed bearing element on the brake support plate and are supported by one of the shoulders formed in the opening. During braking, the strut compresses the spring through one of the two cups by way of the corresponding shoulders. On termination of braking, the spring recenters the strut, driving it back until one of the cups regains its bearing on the associated fixed bearing element, thus recentering the shoes bearing on the strut.

6 Claims, 4 Drawing Figures

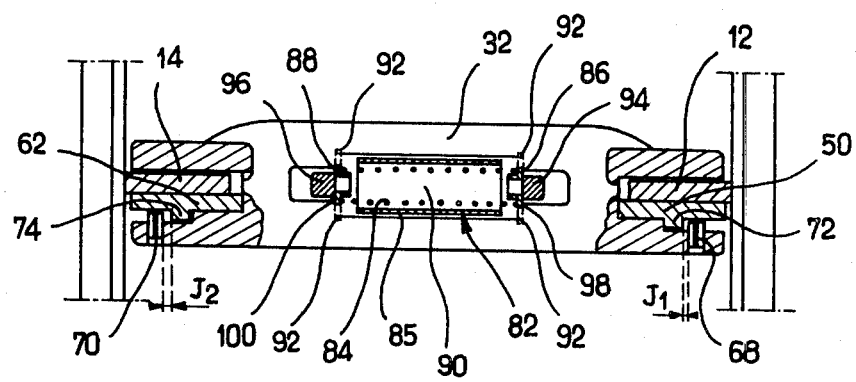
FIG_2
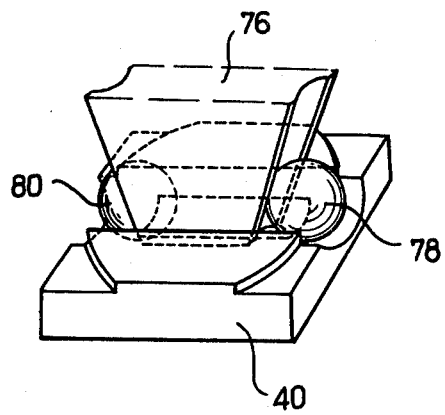
PRIOR ART
FIG_3
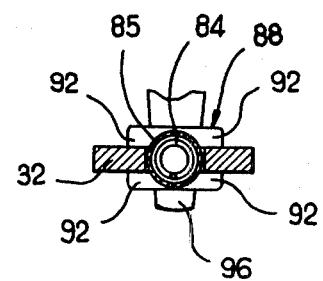
FIG_4

DRUM BRAKE WITH AUTOMATIC RECENTERING OF THE SHOES

The invention concerns a drum brake with automatic recentering of the shoes.

The invention relates more particularly to a drum brake of the type comprising a supporting plate on which are mounted two shoes capable of being brought into frictional engagement against a rotating drum by a brake motor interposed between two first adjacent ends of the shoes, a strut being interposed between the other two ends of the shoes, the brake motor urging a first shoe, the second shoe being urged by the strut placed between the other two ends of the shoes.

In this type of drum brake, the shoe urged directly by the brake motor, called leading shoe, moves circumferentially along the drum to find a reaction on the strut and, through this reaction, urge into frictional engagement the second shoe, which finds a fixed bearing point on the brake motor. The length of the strut being defined, the return spring placed on the ends of the shoes and maintaining them bearing on the strut in the rest position has no influence on the position of the shoes relative to the drum when braking is released. In particular, the trailing shoe, the one which is urged by the strut, is capable of remaining in contact with the drum, the available clearance between the shoes and the drum being capable of being used entirely by the leading shoe to move away from the drum. The brake therefore risks remaining in contact with the drum and continuing to generate a torque in a manner which is uncontrolled by the driver, and similarly premature wear of the linings may appear.

The invention proposes a brake of the type defined above in which such disadvantages are avoided, for after each use, the strut regains a central position and therefore the two shoes are removed from the drum.

According to the invention, the strut comprises a recentering device ensuring a mechanical stop for each of the two shoes, thus defining a position at a distance from the drum.

With this object, the invention proposes a drum brake comprising a supporting plate on which are mounted in sliding relationship two shoes capable of being brought into friction engagement against a rotating drum by a brake motor interposed between two first adjacent ends of the shoes, said first ends being urged towards each other by elastic means, a strut being interposed between the other two ends of the shoes, said other ends being urged into bearing on said strut with the aid of elastic means, said strut bearing a recentering device, abutting two fixed bearing elements relative to said supporting plate and two bearing portions carried by said strut, said device urging said strut towards a central rest position, said recentering device comprising elastic means abutting at one end one of said fixed elements and one of said portions and at the other end abutting the other of said fixed elements and the other of said portions, characterized in that said strut comprises a cut-out section in which are capable of sliding two bearing pieces between which is mounted a spring forming elastic means of the recentering device.

A preferred embodiment of the invention will now be described, by way of example without limitations, referring to the attached drawings in which:

FIG. 2 shows a sectional view of the brake of FIG. 1 along line I—I of the same figure;

FIG. 3 shows a schematic perspective view of the brake motor used in the brake of FIG. 1; and FIG. 4 shows a sectional view of the strut along line II—II of FIG. 1.

Figure 1:
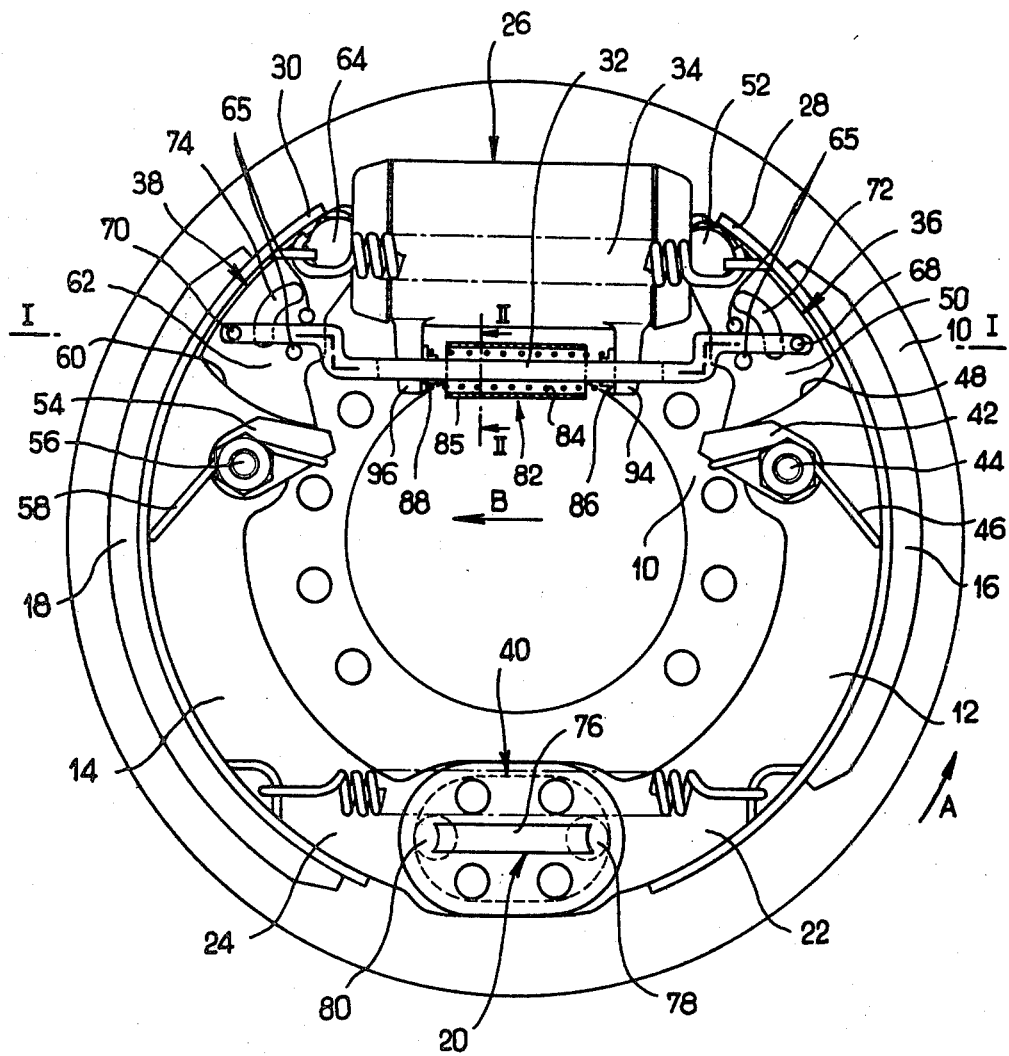
FIG. 1 shows a plan view of a drum brake according to the invention.

The drum brake shown in FIG. 1 comprises a supporting plate 10 normally associated with a fixed part of the vehicle (not shown) on which are mounted in sliding relationship two brake shoes 12 and 14 bearing friction elements 16 and 18 respectively. A mechanically actuated brake motor designated in its entirety by the reference 20 is interposed between the first ends 22 and 24 of the shoes 12 and 14 respectively. In the same way, in the embodiment described, a second hydraulically actuated brake motor 26 is interposed between the other two ends 28 and 30 respectively of the shoes 12 and 14. A strut 32 is placed in the vicinity of the hydraulic brake motor 26 and ensures connection of the shoes 12 and 14 during setting in operation of the mechanically actuated brake motor 20. A spring 34 normally urges the shoe 12 into abutment against the strut 32 via a wear compensating device 36. In the same way, the spring 34 urges the shoe 14 in abutment against the strut 32 via a second wear compensating device 38. An anchor block 40 is disposed between the ends 22 and 24 of the shoes 12 and 14 to ensure anchorage of the latter during setting in operation of the second hydraulic brake motor 26.

The wear compensating device 36 comprises a pawl 42 mounted pivotably, via a rivet or equivalent forming a pivot 44, on the web of the shoe 12. The end of the pawl 42 is maintained in contact, by the action of a torsion spring 46, with a toothed sector 48 formed on the end of a lever 50 mounted pivotably via a rivet or equivalent forming a pivot 52 on the web of the shoe 12. In the same way, the wear compensating device 38 comprises a pawl 54 mounted pivotably via a rivet or equivalent forming a pivot 56 on the web of the shoe 14. The end of the pawl 54 is maintained in contact, by the action of a torsion spring 58, with a toothed sector 60 formed on the end of a lever 62 mounted pivotably, via a rivet or equivalent forming a pivot 64, on the web of the shoe 14. The adjuster levers 50 and 62 bear projections 65 which ensure positioning of the strut 32 relative to these levers. The wear compensating devices 36 and 38 are set in operation by split cylindrical pins, respectively 68 and 70, mounted on the strut 32 and capable of cooperating with projections 72 and 74 carried by the levers 50 and 62 respectively, after an approach path respectively J1 and J2 as shown in FIG. 2.

The mechanically actuated brake motor 20 may be of the type of the one describe in the French patent published under the No. 2 291 411 and shown schematically in FIG. 3. This motor comprises a wedge 76 capable of urging apart two spherical elements 78 and 80 which themselves urge apart the ends 22 and 24 of the shoes 12 and 14 respectively.

The strut 32 bears a recentering device designated in its entirety by the reference 82. This device comprises a spring 84 mounted between two cups 86 and 88 placed in an opening 90 formed in the strut 32. The cups 86 and 88 comprise projections 92, see in particular FIG. 4, allowing them to slide in the opening 90 formed in the strut 32. The cups 86 and 88 abut fixed bearing elements 94 and 96 carried by the brake motor 26 and bearing portions 98 and 100 formed by shoulders effected in the opening 90 of the strut 32. A tube 85 is mounted around the spring 84 to avoid the latter buckling.

The brake which has just been described operates in the following manner:

At rest, the different elements of the brake occupy the positions shown in FIG. 1. During hydraulic setting in operation of the brake, pressurization of the brake motor 26 urges the shoes 12 and 14 in anchorage against the bearing surfaces formed on the anchor block 40, thus bringing the friction elements 16 and 18 into frictional contact with the drum (not shown). If compensation of wear of the linings is necessary, the levers 50 and 62 are urged by the split cylindrical pins 68 and 70 across the projections 72 and 74 in such a way that the pawls 42 and 54 jump one or more teeth on the toothed sectors 48 and 60 respectively, so that the distance between the ends 28 and 30 of the shoes becomes greater than before setting the brake motor 26 in operation; the spring 84 of the recentering device 82 having a prestress such that the strut 32 remains stationary during movement of the shoes 12 and 14 and therefore during setting in operation of the wear compensating devices 36 and 38.

When the brake is set in operation by means of the brake motor 20, the wedge 76 is urged downwards, considering FIG. 3, so that it tends to separate the balls 78 and 80 which urge the ends 22 and 24 of the shoes apart from each other. Designating by the arrow A the direction of rotation of the drum (not shown) while moving forwards, the shoe 12 is defined as being the leading shoe and the shoe 14 as being the trailing shoe. When the distance between the ends 22 and 24 of the shoes is such that the friction elements 16 and 18 come into contact with the rotating drum (not shown), frictional engagement of the friction element 16 entrains the shoe 12 in the direction of the arrow A. The shoe 12 effects a reaction of bearing on the strut 32 which moves in the direction of the arrow B, thus urging the shoe 14 into frictional engagement against the rotating drum. The shoe 14 effects a reaction of bearing on the anchor block 40, driving back the ball 80. During movement of the strut 32, the cup 86 is driven by the shoulder 98 of the opening 90 away from the fixed bearing element 94, this being while compressing the spring 84. The cup 88, abutting the fixed bearing element 96, does not move. On releasing braking, the spring 84 drives back the strut 32 via the cup 86 bearing on the shoulder 98 until said cup 86 comes to bear on the fixed bearing element 94, the strut 32 thus regaining its recentered position relative to the brake. As the spring 34 maintains the shoes 12 and 14 on the strut 32, the shoes 12 and 14 are removed from the rotating drum (not shown) in such a way that any parasitic friction is eliminated. The distance between the drum and each of the shoes after release of the brake obviously depends on each of the wear compensating devices 36 and 38 and in particular on the clearances J1 and J2 existing between the split cylindrical pins 68 and 70 and the projections 72 and 74 respectively.

During operation while reversing, the drum rotating in the reverse direction to the arrow A, in the same way as above there may be defined a leading shoe which is the shoe 14 and a trailing shoe which is the shoe 12, and the strut 32 then moves in the opposite direction to the arrow B, and the cup 88 moves in the opposite direction to the arrow B so as to compress the spring 84 and move away from the fixed bearing element 96. On release, the cup 88 drives back the strut 32 until the cup 88 comes into contact with the fixed bearing element 96. It can thus be seen that the strut 32, whatever the direction of rotation of the drum, regains a central position after release of braking so that the shoulders 98 and 100 are in alignment with the fixed bearing elements 94 and 96. The shoes, coming to bear on the strut 32 by means of the spring 34, are therefore supported after each release of braking on a mechanical stop so that each of the shoes is located at a distance from the rotating drum.

In the embodiment which has just been described, the drum brake comprises a second brake motor and wear compensating devices on each of the shoes, but it is clearly understood that the second brake motor and the wear compensating devices are not necessary to the invention, and could be suppressed or replaced by similar devices without departing from the scope of the present invention. Similarly, the first mechanically actuated brake motor could be replaced by a hydraulic brake motor without departing from the scope of the present invention.

I claim:

1. A drum brake comprising a support plate on which is mounted in sliding relationship two brake shoes capable of being brought into friction engagement with a rotating drum by brake shoe expansion means interposed between adjacent first ends of the shoes, said first ends retracted towards each other by resilient means, brake motor means interposed between adjacent second ends of the shoes, a strut interposed between and operatively connected to the second ends of said shoes, second resilient means retracting the second ends of the shoes into engagement with said strut, said strut having an opening therethrough including shoulders, abutments fixed relative to the support plate and extending into the opening of the strut, a free-floating recentering device disposed within said opening and comprising two slidable elements each engaging peripheral areas about the opening of said strut to provide slidable engagement therebetween, and spring means disposed between and supported by the slidable elements, said slidable elements each engaging a respective shoulder and abutment whereby activation of said brake motor means effects expansion of the second ends of the brake shoes and operatively effects expansion of the first ends including circumferential rotational displacement of the shoes relative to said brake motor means so that the shoes engage the rotating drum and upon deactivation of said brake motor means the recentering device effects return of said brake shoes to a central position relative to the rotating drum.

2. The drum brake in accordance with claim 1, wherein said shoulders are disposed at respective ends of said opening in the strut.

3. The drum brake in accordance with claim 2, wherein each abutment is disposed at an end of the opening in said strut and positioned for engagement by a respective slidable element.

4. The drum brake in accordance with any one of claims 1—3, wherein said brake motor means comprises a hydraulic brake cylinder disposed between the second ends of the shoes and the brake shoe expansion means comprises an anchored means providing for lateral movement of the first ends relative to said brake shoe expansion means.

5. The drum brake in accordance with claim 4, further comprising brake shoe wear compensation devices disposed on the respective second ends of the brake shoes, and a projection extending from each end of said strut for engagement with the respective wear compensation device whereby said brake shoes are displaced relative to said supporting plate to compensate for wear of the respective brake shoe.

6. The drum brake in accordance with claim 5, wherein the spring means supported by said strut exerts biasing force against said slidable elements and shoulders and of a magnitude greater than the force necessary to actuate either of the wear compensation means.

* * * * *